United States Patent [19]
Bilkadi et al.

[11] Patent Number: 5,633,049
[45] Date of Patent: May 27, 1997

[54] METHOD OF MAKING PROTECTIVE COATING FOR THERMOPLASTIC TRANSPARENCIES

[75] Inventors: Zayn Bilkadi, Mahtomedi; Thomas W. Rambosek, Woodbury, both of Minn.

[73] Assignee: Minnesota Mining and Manufacturing Company, St. Paul, Minn.

[21] Appl. No.: 526,009

[22] Filed: Sep. 8, 1995

Related U.S. Application Data

[63] Continuation-in-part of Ser. No. 426,495, Apr. 20, 1995, abandoned.

[51] Int. Cl.$^6$ .................................................. C08F 2/46
[52] U.S. Cl. ..................... 427/487; 427/164; 427/385.5; 427/496; 427/508; 427/532; 427/551; 427/557; 427/558; 427/559
[58] Field of Search .................................. 427/542, 164, 427/385.5, 487, 496, 508, 532, 551, 557, 558, 559

[56] References Cited

U.S. PATENT DOCUMENTS

| | | | |
|---|---|---|---|
| 3,488,215 | 1/1970 | Shepherd et al. | 117/124 |
| 3,635,756 | 1/1972 | Shepherd et al. | 117/124 D |
| 4,319,811 | 3/1982 | Tu et al. | 351/166 |
| 4,421,782 | 12/1983 | Bolgiano et al. | 427/53.1 |
| 4,427,823 | 1/1984 | Inagaki et al. | 524/833 |
| 4,550,059 | 10/1985 | Dalton et al. | 428/409 |
| 4,722,377 | 2/1988 | Moncur | 526/323.2 |
| 4,877,715 | 10/1989 | Koch et al. | 430/271 |
| 4,885,332 | 12/1989 | Bilkadi | 524/714 |
| 4,954,591 | 9/1990 | Belmares | 526/264 |
| 5,104,929 | 4/1992 | Bilkadi | 524/847 |
| 5,180,757 | 1/1993 | Lucey | 522/76 |
| 5,391,210 | 2/1995 | Bilkadi et al. | 51/298 |

FOREIGN PATENT DOCUMENTS 475592  3/1992  European Pat. Off.

OTHER PUBLICATIONS

ASTM Designation: D 1003–61, "Standard Test Method for Haze and Luminous Transmittance of Transparent Plastics", pp. 356–361 (Nov. 1961).

ASTM Designation: F 484–83, "Standard Test Method for Stress Crazing of Acrylic Plastics in Contact with Liquid or Semi–Liquid Compounds", pp. 599–601 (Feb. 1984).

ASTM Designation: G26–88, "Standard Practice for Operating Light–Exposure Apparatus (Xenon–Arc Type) with and Without Water for Exposure of Nonmetallic Materials", pp. 1005–1013 (Sep. 1988).

ASTM Designation: D 522–92, "Standard Test Methods for Mandrel Bend Test of Attached Organic Coatings", pp. 85–89 (May 1992).

ASTM Designation: D 1044–93,m "Standard Test Method for Resistance of Transparent Plastics to Surface Abrasion", pp. 256–259 (Dec. 1993).

ASTM Designation: D 3359–93, "Standard Test Methods for Measuring Adhesion by Tape Test", pp. 433–438 (Jan. 1994).

*Primary Examiner*—Bernard Pianalto
*Attorney, Agent, or Firm*—Gary L. Griswold; Walter N. Kirn; Doreen S. L. Gwin

[57] ABSTRACT

The present invention provides an acid-resistant protective coating, preferably an acid- and abrasion-resistant protective coating, for thermoplastic transparencies, particularly aircraft transparencies. The coating is prepared from a silica-free protective coating precursor composition comprising a multifunctional ethylenically unsaturated ester of acrylic acid, a multifunctional ethylenically unsaturated ester of methacrylic acid, or a combination thereof; and an acrylamide.

9 Claims, 1 Drawing Sheet

METHOD OF MAKING PROTECTIVE COATING FOR THERMOPLASTIC TRANSPARENCIES

CROSS-REFERENCE TO RELATED APPLICATION

This application is a Continuation-In-Part of U.S. patent application Ser. No. 08/426,495, filed on Apr. 20, 1995 abandoned, which is incorporated herein by reference.

FIELD OF THE INVENTION

The present invention relates to protective coatings, particularly acid resistant coatings for transparent thermoplastic substrates, such as aircraft transparencies. The protective coating of the invention is formed from a precursor composition containing a multifunctional ethylenically unsaturated ester of (meth)acrylic acid and an acrylamide.

BACKGROUND OF THE INVENTION

Transparent thermoplastic materials, such as polycarbonates and polyacrylates, are used in a variety of substrates such as eyeglass, binocular, and camera lenses, as well as automobile, train, bus, and airplane windows. These thermoplastic materials are relatively light weight, tough, shatter resistant, and can withstand a wide range of temperatures and pressure gradients. One limitation, however, with these thermoplastic materials is that they are "relatively soft" and can be easily scratched and "crazed" or etched, especially under acidic conditions.

One particularly severe use of such thermoplastic materials is in aircraft transparencies, which, during flight, typically experience significant temperature variations (e.g., from −70° F. to 110° F.), severe pressure gradients as a result of cabin pressurization-depressurization cycles, relatively severe acidic environmental conditions, and severe weathering due mainly to ultraviolet light at high altitudes. As a result of such severe conditions, scratching and crazing of aircraft transparencies are accelerated, thereby inhibiting the optical clarity of the transparency.

In recent years, abrasion resistant coatings for transparent thermoplastic substrates (i.e., thermoplastic transparencies) have been developed that reduce the scratching and crazing of the substrates. See, for example, U.S. Pat. No. 3,488,215 (Shepherd et al.), U.S. Pat. No. 3,635,756 (Shepherd et al.), U.S. Pat. No. 4,885,332 (Bilkadi), U.S. Pat. No. 5,104,929 (Bilkadi), and U.S. Pat. No. 4,954,591 (Belinares). U.S. Pat. No. 4,954,591 discloses the use of N,N-(dialkyl)acrylamides in tintable abrasion resistant coatings for polycarbonate ophthalmic lenses. Tintability, however, as well as discoloration with aging, are not desirable properties for protective coatings designed for aircraft transparencies. In fact, the additives required to impart tintability typically severely degrade the abrasion resistance, the weatherability under ultraviolet light, and the acid resistance of radiation curable materials used in protective coatings.

It is believed that none of these coatings possess the properties necessary for protecting thermoplastic transparencies under the harsh conditions experienced by aircraft transparencies. Thus, a need exists for coatings that can withstand the severe conditions experienced by aircraft transparencies. Such coatings should ideally be resistant to temperature cycling, resistant to mechanical stresses, resistant to prolonged exposure to severe acidic conditions, and resistant to tinting and discoloration.

SUMMARY OF THE INVENTION

The present invention provides a silica-free precursor composition curable to an acid-resistant protective coating, preferably an acid- and abrasion-resistant coating, for thermoplastic transparent substrates, i.e., thermoplastic transparencies. The precursor compositions are particularly well suited for adhering to thermoplastic transparencies without the use of primers, and provides cured coatings with characteristics necessary for use on aircraft transparencies. The present invention also provides the coated thermoplastic transparency and a method of preparing such transparency.

The present invention provides a silica-free precursor composition curable to an acid-resistant protective coating for a thermoplastic transparency, the silica-free protective coating precursor composition comprising:

(a) a multifunctional ethylenically unsaturated ester of acrylic acid capable of hydrogen bonding, a multifunctional ethylenically unsaturated ester of methacrylic acid capable of hydrogen bonding, or a combination thereof; and (b) an acrylamide of the formula:

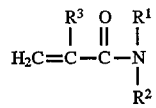

wherein:
(i) $R^1$ is a $(C_1-C_4)$alkyl group;
(ii) $R^2$ is a $(C_1-C_4)$alkyl group; and
(iii) $R^3$ is hydrogen, a halogen, or a methyl group.

The present invention also provides an aircraft transparency having a surface on which is coated an acid-resistant cured protective coating formed from a silica-free protective coating precursor composition comprising:

(a) a multifunctional ethylenically unsaturated ester of acrylic, a multifunctional ethylenically unsaturated ester of methacrylic acid, or a combination thereof, and (b) an acrylamide of the formula:

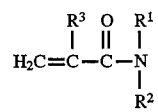

wherein:
(i) $R^1$ and $R^2$ are each independently hydrogen, a $(C_1-C_8)$alkyl group optionally having hydroxy, halide, carbonyl, and amido functionalities, a $(C_1-C_8)$alkylene group optionally having carbonyl and amido functionalities, a $(C_1-C_4)$alkoxymethyl group, a $(C_4-C_{18})$aryl group, a $(C_1-C_3)$alk$(C_4-C_{18})$aryl group, and a $(C_4-C_{18})$heteroaryl group; with the proviso that only one of $R^1$ and $R^2$ is hydrogen; and
(ii) $R^3$ is hydrogen, a halogen, or a methyl group.

During the manufacture of the coated thermoplastic transparency, the protective coating precursor composition is applied to at least one surface of the thermoplastic transparency. Preferably and advantageously, this protective coating precursor composition is directly applied to the thermoplastic transparency such that there is no primer or other adhesion promoter between the protective coating and the thermoplastic substrate.

The protective coating precursor composition is in a flowable state, which is subsequently exposed to conditions that cure the composition and form an acid-resistant protective coating, preferably an acid- and abrasion-resistant coating. The conditions that affect curing include thermal energy and radiation energy, such as electron beam, ultraviolet light, or visible light.

The preferred multifunctional ethylenically unsaturated esters of acrylic or methacrylic acid are tri- or tetrafunctional acrylates or methacrylates. Examples of such materials include pentaerythritol triacrylate and pentaerythritol trimethacrylate. A particularly preferred acrylamide is N,N-dimethyl acrylamide.

For a coating requiring optical clarity, the precursor composition preferably includes a leveling agent. Additionally, it is preferred to include an initiator, such as a thermal initiator or a photoinitiator, in the abrasion resistant coating precursor composition. The initiator helps to initiate the curing, i.e., polymerization and crosslinking, of the coating precursor composition to form the coating. Also, in certain preferred embodiments, the protective coating precursor composition can further include photosensitizers, ultraviolet stabilizers, and the like.

The protective coating precursor compositions of the present invention are suitable for forming protective coatings on thermoplastic transparencies made of materials such as acrylics, polycarbonates, polyesters, and their copolymers, for example. They are particularly suitable for forming protective coatings, preferably, abrasion resistant coatings, on aircraft transparencies, such as those used on military or commercial airplanes or helicopters.

DETAILED DESCRIPTION

Figure 1:
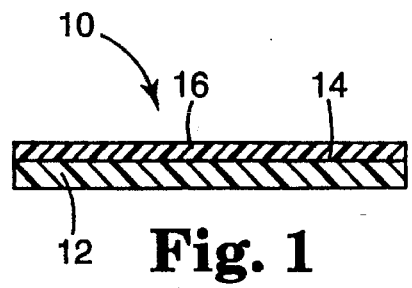
FIG. 1 is a cross-sectional view of a coated transparent thermoplastic substrate, such as a passenger aircraft transparency.

A protective coating for a thermoplastic transparency is used to prevent deterioration of the thermoplastic transparency as a result of exposure to environmental conditions. Thus, a protective coating should not significantly degrade the thermoplastic material or adversely affect its physical properties. This is a particularly important requirement where safety is a concern. A protective coating should also adhere well to a thermoplastic material. The protective coatings of the present invention adhere well to thermoplastic transparencies without causing significant degradation. They also adhere well under wet conditions, extreme temperature conditions, and acidic conditions, as described herein below in the Examples.

The protective coatings of the present invention are acid resistant. By this it is meant that the coatings withstand at least 96 hours of acid etching with 75 wt-% concentrated sulfuric acid solution with substantially no delamination or degradation. Preferably, they also can withstand temperatures ranging from about −197° C. to about 82° C. with substantially no delamination or degradation. Furthermore, preferably, the protective coatings of the present invention can also resist significant tinting, even when immersed in tinting dyes.

Preferably, the protective coatings of the present invention are also abrasion resistant. That is, preferably, the protective coatings of the present invention reduce the amount of abrasion, e.g., scratching and crazing, of the thermoplastic transparency surface (when compared to the thermoplastic transparency without the protective coating). Abrasion resistant coatings of the present invention preferably exhibit less than about 20% haze change, more preferably less than about 15% haze change, and most preferably less than about 10% haze change, at 500 cycles, according to the Abrasion Resistance test method described herein below in the Examples.

More preferably, the protective coatings provide improved weatherability to the thermoplastic transparencies on which they are coated, particularly if used on thermoplastic transparencies that are exposed to sunlight. That is, the acid-resistant protective coatings of the present invention should preferably withstand at least 2000 hours of accelerated weathering by ultraviolet light without significant discoloration (e.g., yellowing), according to the Weatherability test method described herein below in the Examples. For certain applications, a protective coating should also be sufficiently transparent (i.e., optically clear) such that a human being can see through it reasonably well.

Most preferably, the protective coatings of the present invention are flexible, particularly if used on thermoplastic transparencies that undergo extreme pressure differences. That is, the acid-resistant protective coatings of the present invention should preferably have an arc radius of less than about 4 inches (10 cm) before cracks, degradation, or delamination are seen when subjected to the Flexibility test method described herein below in the Examples.

The protective coatings of the present invention can be used on thermoplastic transparencies in a variety of applications, although they are particularly useful on aircraft transparencies. They can be used on the thermoplastic transparencies used in eyeglasses, diving masks, ski goggles, camera lenses, microscope lenses, telescope lenses, binoculars, gun sights, aircraft transparencies, automobile (i.e., car, truck, bus) windows, train windows, windows in buildings, etc. Referring to FIG. 1, a coated thermoplastic transparency 10 having a thermoplastic transparent substrate 12 is coated on at least one surface 14 with a protective coating 16. It should be understood that the coating can be present on all surfaces of the substrate, although typically only one surface is coated.

The protective coating is formed from a silica-free precursor composition containing a multifunctional ethylenically unsaturated ester of acrylic acid, a multifunctional ethylenically unsaturated ester of methacrylic acid, or a combination thereof, and an acrylamide compound. During manufacture, the silica-free precursor composition is applied to at least one surface of the thermoplastic transparency and cured to form the protective coating. The curing process can be carried out at room temperature (i.e., 25°–30° C.) with radiation, which is particularly advantageous for transparencies that warp during the thermal curing of coatings.

The silica-free precursor compositions of the present invention are particularly suitable for coating aircraft transparencies, which experience more extreme conditions during use than most thermoplastic transparencies. For example, aircraft such as military jets, fighter planes, transport airplanes, helicopters, bombers, and the like, as well as private aircraft and commercial aircraft such as the DC-9 and DC-10 aircraft from McDonnell Douglas (St. Louis, Mo.) and the 727 and 747 aircraft from Boeing (Seattle, Washington), are capable of flying at altitudes about 30,000 feet (typically between about 30,000 and about 40,000 feet)

above sea level. Thus, the pressure and temperature differentials experienced during the ascent and descent of the aircraft are extreme, which can cause delamination of the coating from the thermoplastic transparency. Furthermore, the atmosphere has a significant acidic character at the cruising altitudes of airplanes, which can cause coatings on thermoplastic transparencies to crack, delaminate, and generally degrade. Thus, the coatings used on aircraft transparencies must withstand harsher conditions than coatings on many other thermoplastic transparencies.

Figure 2:
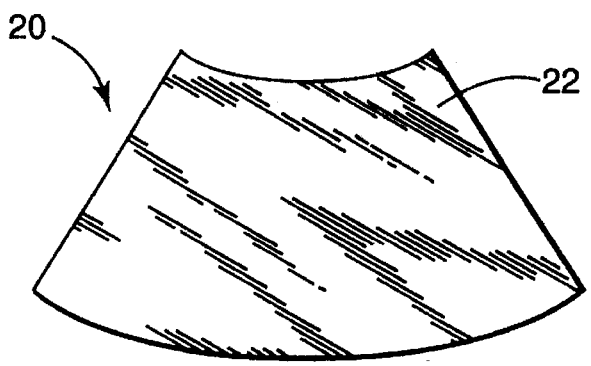
FIG. 2 is a perspective view of a coated cockpit transparency.
Figure 3:
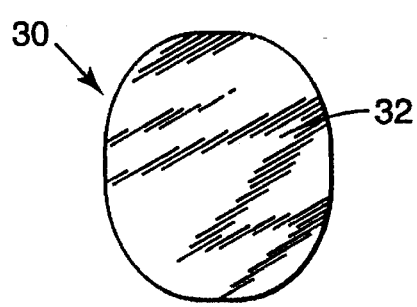
FIG. 3 is a perspective view of a passenger aircraft window.

The aircraft transparency can be a windscreen (i.e., cockpit) transparency, an aircraft door transparency, or a passenger transparency. Referring to FIG. 2, a windscreen or cockpit transparency 20 is shown having a protective resistant coating 22. Referring to FIG. 3, a passenger aircraft window 30 is shown having a abrasion resistant coating 32. For commercial passenger aircraft there are typically 2–3 separate thermoplastic transparencies for a single commercial aircraft passenger transparency or window system. For example, one transparency is present on the inside of the aircraft and one on the outside of the aircraft with a third one sandwiched therebetween. Although the abrasion resistant coating of the present invention could be used on any of these three transparencies, it is particularly useful on the transparency on the outside of the aircraft. This outside transparency is the most detrimentally affected by the acidic conditions of the atmosphere, pressure differentials, as well as weathering and "abrasive" type conditions. Thermoplastic transparencies are typically made from a transparent thermoplastic material such as acrylic, polycarbonate, polyester, acrylonitrile butadiene-styrene copolymer, styrene, acrylonitrile-styrene copolymer, cellulose ester, polyvinylchloride, polystyrene, and polyphenyleneoxide. The term "acrylic" includes materials commonly referred to as cast acrylic sheeting, polymethylmethacrylate, stretched acrylic, and the like. The transparency can be made according to U.S. military specification MIL-P-25690, which is incorporated herein by reference. Preferably, the thermoplastic transparencies to which the coatings of the present invention adhere the most effectively are made from an acrylic or a polycarbonate. The transparency thickness can vary, however, it typically ranges from about 0.1 mm to about 1000 mm, and more typically from about 10 mm to about 200 mm. Additionally, the thermoplastic transparency can be a laminate of two or more different thermoplastic materials adhered together, either with or without an adhesive layer therebetween. Commercial thermoplastic transparencies are available from a wide variety of suppliers including Nordam, Texstar, Sierracin/Slymar and Pilkington.

The thermoplastic transparency can be made by a variety of different methods. For example, the thermoplastic material can be extruded and then cut to the desired dimension. It can be molded to form the desired transparency shape and dimension. Also, it can be cell cast and subsequently heated and stretched to form the thermoplastic transparency.

The protective coating precursor composition of the invention can be applied to a new or refurbished transparency. In some instances, after repeated use and wear, the coating can contain minor defects or scratches, although the underlying thermoplastic material is substantially unaffected and is in relatively "good" shape. To replace the coating, the worn coating is abraded away by conventional abrasives articles (diamond cut, coated abrasives, or nonwoven abrasives) and a new coating is applied to the thermoplastic transparency.

The protective coating is applied to the outer surface of the thermoplastic transparency as a liquid, flowable coating precursor. Upon curing, i.e., polymerizing and crosslinking, the coating precursor composition is solidified to form the coating. The coating precursor composition comprises a mixture of two major components. The first major component is a multifunctional ethylenically unsaturated ester of an acrylic or methacrylic acid (i.e., a multifunctional acrylate or methacrylate, herein referred to as "(meth)acrylate"), which is preferably capable of hydrogen bonding, or combination thereof, which imparts hardness to the coating. The second major component is an acrylamide compound, which imparts toughness and flexibility to the coating.

The multifunctional ethylenically unsaturated ester of (meth)acrylic acid is preferably selected from the group consisting of a difunctional ethylenically unsaturated ester of acrylic or methacrylic acid, a trifunctional ethylenically unsaturated ester of acrylic or methacrylic acid, a tetrafunctional ethylenically unsaturated ester of acrylic or methacrylic acid, and a combination thereof. Of these, trifunctional and tetrafunctional ethylenically unsaturated esters of (meth)acrylic acid are more preferred.

Preferred multifunctional ethylenically unsaturated esters of (meth)acrylic acid can be described by the formula:

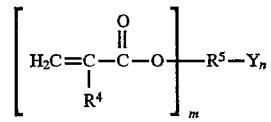

wherein $R^4$ is hydrogen, halogen or a $(C_1-C_4)$alkyl group (preferably $R^4$ is hydrogen or a methyl group); $R^5$ is a polyvalent organic group, which can be cyclic, branched, or linear, aliphatic, aromatic, or heterocyclic, having carbon, hydrogen, nitrogen, nonperoxidic oxygen, sulfur, or phosphorus atoms; Y is hydrogen, $(C_1-C_4)$alkyl, or a protic functional group; m is an integer designating the number of acrylic or methacrylic groups in the ester and has a value of at least 2; and n has a value of the valence of $R^5$ −m. Referring to this formula, preferably, $R^5$ has a molecular weight of about 14–100, m has a value of 2–6 (more preferably m has a value of 2–5, most preferably m has a value of 3–4, or where a mixture of multifunctional acrylates and/or methacrylates are used, m has an average value of about 2.05–5), n is an integer having a value of 1 to 3, and Y is a protic functional group. Preferred protic functional groups are selected from the group consisting of—OH, —COOH, —SH, —PO(OH)$_2$, —SO$_3$H, and —SO(OH)$_2$.

Examples of suitable multifunctional ethylenically unsaturated esters of (meth)acrylic acid are the polyacrylic acid or polymethacrylic acid esters of polyhydric alcohols including, for example, the diacrylic acid and dimethylacrylic acid ester of aliphatic diols such as ethyleneglycol, triethyleneglycol, 2,2-dimethyl-3,3-propanediol, 1,3-cyclopentanediol, 1-ethoxy-2,3-propanediol, 2-methyl-2,4-pentanediol, 1,4-cyclohexanediol, 1,6-hexamethylenediol, 1,2-cyclohexanediol, 1,6-cyclohexanedimethanol; the triacrylic acid and trimethacrylic acid esters of aliphatic triols such as glycerin, 1,2,3-propanetrimethanol, 1,2,4-butanetriol, 1,2,5-pentanetriol, 1,3,6-hexanetriol, and 1,5,10-decanetriol; the triacrylic acid and trimethacrylic acid esters of tris(hydroxyethyl) isocyanurate; the tetraacrylic and tetramethacrylic acid esters of aliphatic triols, such as 1,2,3,4-butanetetrol, 1,1,2,2,-tetramethylolethane, 1,1,3,3-tetramethylolpropane, and pentaerythritol tetraacrylate; the pentaacrylic acid and pentamethacrylic acid esters of aliphatic pentols such as adonitol; the hexaacrylic acid and hexamethacrylic acid esters of hexanols such as sorbitol and dipentaerythritol; the diacrylic acid and dimethacrylic acid esters of aromatic diols such as resorcinol, pyrocatechol, hisphenol A, and bis(2-hydroxyethyl) phthalate; the trimethacrylic acid ester of aromatic triols such as pyrogallol, phloroglucinol, and 2-phenyl-2,2-methylolethanol; and the hexaacrylic acid and hexamethacrylic acid esters of dihydroxy ethyl hydantoin; and mixtures thereof Preferably, for particularly advantageous acid resistance, the multifunctional ethylenically unsaturated ester of (meth) acrylic acid is a nonpolyethereal multifunctional ethylenically unsaturated ester of (meth)acrylic acid. More preferably, the multifunctional ethylenically unsaturated ester of (meth)acrylic acid is selected from the group consisting of pentaerythritol triacrylate, pentaerythritol trimethacrylate, and a combination thereof. Most preferably, the multifunctional ethylenically unsaturated ester of (meth) acrylic acid is pentaerythritol triacrylate.

In addition to the multifunctional ethylenically unsaturated esters of acrylic acid, the coating precursor composition includes an acrylamide. In general, the acrylamide compounds have the following formula:

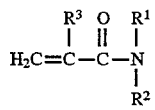

wherein: $R^1$ and $R^2$ are each independently hydrogen, a $(C_1-C_8)$alkyl group optionally having hydroxy, halide, carbonyl, and amido functionalities, a $(C_1-C_8)$ alkylene group optionally having carbonyl and amido functionalities, a $(C_1-C_4)$ alkoxymethyl group, a $(C_4-C_8)$aryl group, a $(C_1-C_3)$alk$(C_4-C_{18})$aryl group, and a $(C_4-C_{18})$heteroaryl group; with the proviso that only one of $R^1$ and $R^2$ is hydrogen; and $R^3$ is hydrogen, a halogen, or a methyl group. Preferably, $R^1$ is a $(C_1-C_4)$alkyl group; $R^2$ is a $(C_1-C_4)$alkyl group; and $R^3$ is hydrogen, a halogen, or a methyl group. $R^1$ and $R^2$ can be the same or different. More preferably, each of $R^1$ and $R^2$ is $CH_3$, and $R^3$ is hydrogen.

Examples of suitable acrylamides are N-(3-bromopropionamidomethyl)acrylamide, N-tert-butylacrylamide, N,N-dimethylacrylamide, N,N-diethylacrylamide, N-(5,5-dimethylhexyl)acrylamide, N-(1,1-dimethyl-3-oxobutyl)acrylamide, N-(hydroxymethyl) acrylamide, N-(isobutoxymethyl)acrylamide, N-isopropylacrylamide, N-methylacrylamide, N-ethylacrylamide, N-methyl-N-ethylacrylamide, N-(fluoren-2-yl)acrylamide, N-(2-fluorenyl)-2-methylacrylamide, 2,3-bis(2-furyl)acrylamide, N,N'-methylene-bis acrylamide. A particularly preferred acrylamide is N,N-dimethyl acrylamide.

For an abrasion-resistant protective coating, the silica-free precursor composition of the present invention preferably includes about 40-95 parts of the multifunctional ethylenically unsaturated ester of acrylic acid, methacrylic acid, or combination thereof, and about 5-60 parts of the acrylamide. More preferably, for an acid-resistant protective coating, the precursor composition of the present invention includes about 65-95 parts of the multifunctional ethylenically unsaturated ester of acrylic acid, methacrylic acid, or combination thereof, and about 5-35 parts of the acrylamide. Most preferably, for a protective coating with the preferred balance between acid resistance, abrasion resistance, and flexibility, the protective coating precursor composition of the present invention includes about 70-90 parts of the multifunctional ethylenically unsaturated ester of acrylic acid, methacrylic acid, or combination thereof, and about 10-30 parts of the acrylamide. These amounts are based upon the total weight of the first and second major components and not any other materials in the precursor composition.

All precursor compositions of the present invention produce coatings that are acid resistant. Based on the disclosure herein, one of skill in the art can readily prepare such precursor compositions and test the coatings for acid resistance. Furthermore, it will be understood by one of skill in the art that certain compositions will be acid resistant only within a narrow window, e.g., within the most preferred compositional ranges listed above, whereas other compositions will be within a broader window of compositional ranges.

It is significant, that these materials can provide an effective coating precursor composition without a filler, particularly a filler such as colloidal silica. Silica is typically used to increase the hardness of the resultant coating. However, it has been discovered that the compositions described herein can produce coatings with suitable hardness values without the need for silica. Thus, the coating precursor compositions are referred to as silica-free precursor compositions.

It is the combination of the multifunctional ethylenically unsaturated esters of (meth)acrylic acid and the acrylamide compound that results in unexpected and improved properties as a protective coating that has properties desirable for use on aircraft transparencies. The multifunctional ethylenically unsaturated esters of (meth)acrylic acid tend to increase the coating's hardness and thereby contribute to the abrasion resistant properties of the coating. On the other hand, the acrylamide compound tends to "toughen" the coating without significant loss in abrasion resistance. This toughness property also results in the coating being able to be flexed. This "flexing" property is extremely important for coatings used on aircraft transparencies because of the severe pressure gradients they experience. If an abrasion resistant coating does not properly flex, then the abrasion resistant coating will develop microcracks in the surface. As a result of these microcracks, acid (i.e., sulfuric acid in the atmosphere) can attack the thermoplastic material underneath. This attack can lead to crazing of the transparency and reduce the optical clarity of the overall aircraft transparency.

Likewise, the acrylamide compound also provides additional protection of the thermoplastic material by contributing to the acid resistance of the cured coating. The acrylamide compound improves the adhesion of the coating to the thermoplastic material forming the transparency. In many instances, the protective coating can adhere directly to the thermoplastic material without the need for an additional primer or adhesion promoter, which is advantageous at least because this results in a labor and material savings. Likewise, this improved adhesion minimizes the possible delamination of the coating at elevated heights.

The coating precursor composition also preferably includes a leveling agent to improve the flow or wetting of the coating precursor composition on the transparent thermoplastic substrate. If the coating precursor composition does not properly wet the thermoplastic substrate, this can lead to visual imperfections (e.g., pin holes and/or ridges) in the coating. This is particularly important when the thermoplastic substrate is an aircraft transparency. Examples of leveling agents include, but are not limited to, alkoxy terminated polysilicones such as that available under the trade designation DOW 57 (a mixture of dimethyl-, methyl-, and (polyethylene oxide acetate)-capped siloxane) from Dow Corning, and fluorochemical surfactants such as those available under the trade designations FC430, FC431, and FX313 from 3M Co., St. Paul, Minn. The coating precursor composition can include an amount of a leveling agent to impart the desired result. Preferably, the leveling agent is present in an amount up to about 3% by weight, and more preferably about 0.5–1%, based on the total weight of the coating precursor composition without solvent. It should be understood that combinations of different leveling agents can be used if desired.

During the manufacture of an abrasion resistant coating, the coating precursor composition is exposed to an energy source, e.g., heat or radiation, that initiates the curing process of the coating precursor composition. This curing process typically occurs via a free radical mechanism, which can require the use of a free radical initiator (simply referred to herein as an initiator, e.g., a photoinitiator or a thermal initiator). If the energy source is an electron beam, the electron beam generates free radicals and no initiator is required. If the energy source is heat, ultraviolet light, or visible light, an initiator is required. When the initiator is exposed to one of these energy sources, the initiator generates free radicals, which then initiates the polymerization and crosslinking.

Examples of suitable free radical thermal initiators include, but are not limited to, peroxides such as benzoyl peroxide, azo compounds, benzophenones, and quinones. Examples of photoinitiators that generate a free radical source when exposed to visible light radiation include, but are not limited to, benzophenones. Examples of photoinitiators that generate a free radical source when exposed to ultraviolet light include, but are not limited to, organic peroxides, azo compounds, quinones, benzophenones, nitroso compounds, acryl halides, hydrozones, mercapto compounds, pyrylium compounds, triacrylimidazoles, bisimidazoles, chloroalkytriazines, benzoin, benzoin methyl ether, benzoin ethyl ether, benzoin isopropyl ether, benzoin isobutyl ethers and methylbenzoin, diketones such as benzil and diacetyl, phenones such as acetophenone, 2,2,2-tribromo-1-phenylethanone, 2,2-diethoxyacetophenone, 2,2-dimethoxy-2-phenylacetophenone, 2,2,2,-tribromo1(2-nitrophenyl)ethanone, benzophenone, and 4,4-bis (dimethyamino)benzophenone. Examples of commercially available ultraviolet photoinitiators include those available under the trade designations IRGACURE 184 (1-hydroxycyclohexyl phenyl ketone), IRGACURE 361 and DAROCUR 1173 (2-hydroxy-2-methyl-1-phenyl-propan-1-one) from Ciba-Geigy. Typically, if used, an amount of an initiator is included in the precursor composition to effect the desired level and rate of cure. Preferably, the initiator is used in an amount of about 0.1–10%, and more preferably about 2–4% by weight, based on the total weight of the coating precursor composition without solvent. It should be understood that combinations of different initiators can be used if desired.

In addition to the initiator, the coating precursor composition of the present invention can include a photosensitizer. The photosensitizer aids in the formation of free radicals that initiate curing of the precursor composition, especially in an air atmosphere. Suitable photosensitizers include, but are not limited to, aromatic ketones and tertiary amines. Suitable aromatic ketones include, but are not limited to, benzophenone, acetophenone, benzil, benzaldehyde, and o-chlorobenzaldehyde, chlorobenzaldehyde, xanthone, tioxanthone, 9,10-anthraquinone, and many other aromatic ketones. Suitable tertiary amines include, but are not limited to, methyldiethanolamine, ethyldiethanolamine, triethanolamine, phenylmethylethanolamine, dimethylaminoethylbenzoate, and the like. Typically, if used, an amount of initiator is included in the precursor compositions to effect the desired level and rate of cure. Preferably, the amount of photosensitizer used in the compositions of the present invention is about 0.01–10%, more preferably about 0.05–5%, and most preferably about 0.25–3% by weight, based on the total weight of the coating precursor composition without solvent. It should be understood that combinations of different photosensitizers can be used if desired.

Polymeric materials are known to degrade by a variety of mechanisms. Common additives that can offset this are known as stabilizers, absorbers, antioxidants, and the like. The coating precursor compositions of the present invention can include one or more of the following: ultraviolet stabilizer, ultraviolet absorber, ozone stabilizer, and thermal stabilizer/antioxidant.

An ultraviolet stabilizer and/or ultraviolet absorber for improving weatherability and reducing the "yellowing" of the abrasion resistant coating with time. An example of an ultraviolet stabilizer includes that available under the trade designation TINUVIN 292 (bis(1,2,2,6,6-pentamethyl-4-piperidinyl)sebacate) and an example of an ultraviolet absorber includes that available under the trade designation TINUVIN 1130 (hydroxyphenyl benzotriazole), both of which are available from Ciba-Geigy. The coating precursor composition can include an amount of either an ultraviolet stabilizer and/or an ultraviolet absorber to impart the desired result. Preferably, the ultraviolet stabilizer or absorber is present in an amount up to about 10% by weight, and more preferably about 1–5%, based on the total weight of the coating precursor composition without solvent. It should be understood that combinations of different ultraviolet stabilizers and absorbers can be used if desired.

An ozone stabilizer protects against degradation resulting from reaction with ozone. Examples of ozone stabilizers include, but are not limited to, hindered amines such as that available under the trade designation IRGONOX 1010 available from Ciba-Geigy and phenoltriazine commercially available from Aldrich. The coating precursor composition can include an amount of an ozone stabilizer to impart the desired result. Preferably, the ozone stabilizer is present in an amount up to about 1% by weight, more preferably about 0.1–1.0%, and most preferably about 0.3–0.5%, based on the total weight of the coating precursor composition without solvent. It should be understood that combinations of different ozone stabilizers can be used if desired.

A thermal stabilizer/antioxidant reduces the amount of yellowing as a result of weathering. Examples of such materials include, but are not limited to, low melting hindered phenols and triesters. Specific examples include 2,6-di-tert-butyl-4-methylphenol commercially available under the trade designation ULTRANOX 226 antioxidant from Borg Warner Chemicals, Inc., Parkersburg, NY; octadecyl 3,5-di-tert-butyl-4-hydroxyhydroxcinnamate commercially available under the trade designations ISONOX 132 antioxidant (Schenectady Chemicals, Inc., Schenectady, NY) or VANOX 1320 antioxidant (Vanderbilt Co., Inc., Norwalk, CT). The coating precursor composition can include an amount of the thermal stabilizer/antioxidant to impart the desired result. Preferably, the thermal stabilizer/antioxidant is present in an amount up to about 3% by weight, and more preferably about 0.5–1%, based on the total weight of the coating precursor composition without solvent. It should be understood that combinations of different thermal stabilizers/antioxidants can be used if desired.

The coating precursor composition can also include an organic solvent to reduce the viscosity of the composition and adjust the percent solids content, and thereby enhance the flow characteristics. The desired viscosity depends on various conditions such as the coating thickness, application technique, and the type of thermoplastic material. In general, the viscosity of the coating precursor composition at 25° C. is about 1–200 centipoise, preferably about 3–75 centipoise, more preferably about 4–50 centipoises, and most preferably about 5–20 centipoise. In general, the solids content of the coating precursor composition is about 5–99%, preferably about 10–70%, more preferably about 15–30%, and most preferably about 17–26% solids.

The organic solvent should be selected such that it is compatible with the first and second major components in the coating precursor composition. As used in this context, "compatible" means that there is minimal phase separation between the solvent and the two major components. Additionally, the solvent should be selected such that it does not adversely affect the cured protective coating properties or attack the thermoplastic material. Furthermore, the solvent should be selected such that it is has an appropriate drying rate. That is, the solvent should not dry too slowly, which would slow down the process of making a coated thermoplastic transparency, but it should not dry too quickly, which could cause defects such as pin holes or craters in the coating. Examples of suitable solvents include alcohols, preferably the lower alcohols such as isopropyl alcohol, n-butanol, methanol, ethanol, ketones such as methyl ethyl ketone, glycols, and combinations thereof.

To make the protective coating precursor composition of the invention, the first and second major components are mixed together, along with the leveling agent and the optional components. Typically, these optional components include solvent, photoinitiator, and ultraviolet stabilizer. During mixing, it is preferred to minimize any air bubbles that can lead to imperfections in the coating. This can be done by exposing the composition to a vacuum during mixing. Additionally, it is preferred to filter the coating precursor composition prior to application to a transparency in an effort to remove gel particles or other agglomerated materials. This can be done by filtering the coating precursor composition through a ten-, five-, or one-micrometer filter that is made of a material that is unreactive with the solvent or any of the components of the composition.

The coating can be applied by any technique such as spray coating, knife coating, dip coating, flow coating, roll coating, and the like. In spray coating, the coating precursor is atomized and then applied to the outer surface of the thermoplastic substrate. In dip coating, the thermoplastic substrate is immersed into the coating precursor and then the excess coating drips off of the thermoplastic substrate. In flow coating, the thermoplastic substrate is held in a vertical position and the coating precursor is applied across the top of the thermoplastic substrate. The coating precursor then flows down the thermoplastic substrate. In roll coating, the coating precursor is applied to the substrate by a roll coater.

Figure 4:
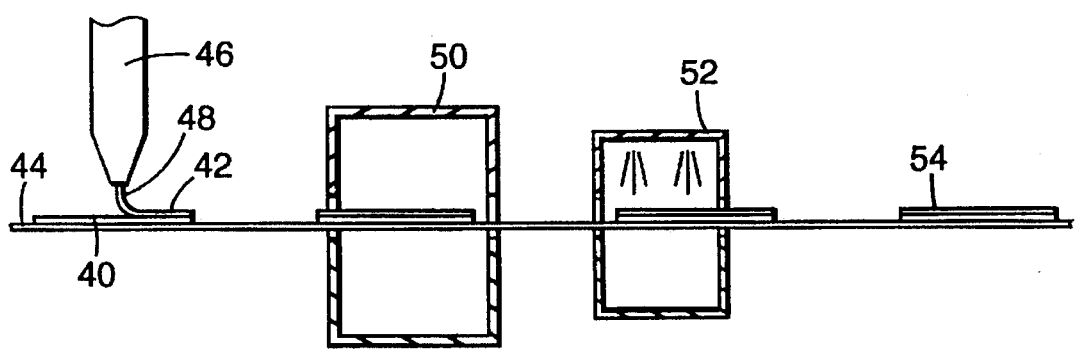
FIG. 4 is a schematic of a process of this invention.

A particularly preferred method of coating involves a continuous process. Referring to FIG. 4, this process includes the steps of placing a thermoplastic transparency 40 having outer surface 42 on a conveyor belt 44. This transparency 40 is conveyed to a coating station 46 where a coating precursor composition 48 is applied to the outer surface 42. Next, the solvent, if used, is flashed off in a flashing unit 50, at a temperature suitable for the solvent used. This is typically accomplished at a temperature of about 15°–75° C., preferably at a temperature of about 40°–65° C. Although a flashing unit is shown, which can be a forced-air oven or an infrared heat source, for example, the solvent can be removed simply by evaporation under ambient conditions. Once the solvent is removed, if it is used, the layer of coating precursor composition 48 is exposed to an energy source 52 to initiate curing the coating precursor composition to form a protective coating 54 on the thermoplastic transparency 40. It should be understood that FIG. 4 is meant to be an illustration of one process of the invention; it is within the scope of this invention to have many variations on this process.

The coating precursor should be applied to the thermoplastic material in a manner to eliminate or minimize any optical imperfections. The coating precursor is typically applied in a clean room, such as a class 1000, preferably a class 100, clean room. If the coating contains defects, such as dust particles or ridges, this can detract from the optical clarity of the transparency or create distortion in the transparency. Some defects can be created during the flashing step; these defects are typically either pin holes or surface roughness caused by uneven drying. To minimize the formation of these defects, the temperature and humidity are often controlled in the clean room or at the coating station. The actual temperature and humidity conditions are dependent upon the chemistry of the coating precursor. Preferably, the coating precursor is applied at a temperature of about 15°–35° C., and more preferably about 20°–25° C. The humidity is preferably about 30–50% relative humidity.

After flashing off the solvent, if used, the coating precursor composition is exposed to an energy source to cure the composition and form a hard coating. This energy source can be thermal energy or radiation energy such as electron beam, ultraviolet light, or visible light. The amount of energy required is primarily dependent on the chemistry of the precursor composition, as well as its thickness and density. For thermal energy, the oven temperature will typically range from about 50° C. to about 250° C. (preferably about 90°–110° C.) for about 15 minutes to about 16 hours. It should be noted that care should be taken during thermal curing not to degrade the thermoplastic material. Electron beam radiation can be used at an energy level of about 0.1 to about 10 megarad (Mrad), preferably at an energy level of about 1 to about 10 Mrad. Ultraviolet radiation refers to nonparticulate radiation having a wavelength within the range of about 200 to about 400 nanometers, preferably within the range of about 250 to 400 nanometers. It is preferred that UV light have an energy level of at least 300 Watts/inch (120 Watts/cm), preferably at least 600 Watts/inch (240 Watts/cm). Visible radiation refers to nonparticulate radiation having a wavelength within the range of about 400 to about 800 nanometers, preferably in the range of about 400 to about 550 nanometers. In general, it is preferred to cure in an inert atmosphere (i.e., minimal oxygen present) such as a nitrogen atmosphere. UV and visible light curing is preferred because there tends to be very little, if any, damage of the thermoplastic material when they are used as the energy source for curing the composition. There is a concern with thermal energy, that if the thermoplastic is either exposed too long and/or at too high of a temperature, this excessive thermal exposure may cause degradation of the thermoplastic material.

The coating can be applied over the entire thermoplastic material surface or a portion thereof. For example, the protective coating is sometimes not applied to the periphery of a passenger aircraft window, because this region is not exposed to atmospheric conditions. The coating thickness will depend upon the formulation and the amount of solvent. Typically, the cured coating will have a thickness of about 0.01–50 micrometers, preferably about 0.1–25 micrometers, and more preferably about 0.1–20 micrometers. The amount of the coating precursor applied to the thermoplastic material is adjusted to provide this coating thickness.

Objects and advantages of this invention will now be illustrated by the following Examples, but the particular materials and amounts thereof recited in these examples, as well as other conditions and details, should not be construed to unduly limit this invention.

EXAMPLES

The following nonlimiting examples will further illustrate the invention. All parts, percentages, ratios, etc., in the examples are by weight unless otherwise indicated. The following designations are used throughout the examples.

TABLE 1

| Material Designations | |
| --- | --- |
| ALSOL | alcohol solvent comprising 70 parts isopropanol, 24 parts ethanol, and 6 parts n-butanol |
| PETA | pentaerythritol triacrylate, commercially available from Sartomer Co., West Chester, PA under the trade designation SR444 |
| DMA | N,N-dimethyl acrylamide, commercially available from Jarchem Co., Newark, NJ |
| PH1 | UV photoinitiator, commercially available from Ciba-Geigy, Ardsley, NY, under the trade designation IRGACURE 184 |
| LA | leveling agent, commercially available from Dow Chemical, Midland, MI, under the trade designation DOW 57 |
| UVST | UV stabilizer, commercially available from Ciba-Geigy, Ardsley, NY, under the trade designation TINUVIN 292 |
| TM1 | a 1 cm thick thermoplastic sheet material made from polymethylmethacrylate, the thermoplastic material was made into an aircraft transparency according to U.S. Military Standard MIL-P25690; this aircraft transparency did not contain a hard coating |
| TM2 | a 0.3 cm thick thermoplastic sheet material made from a cell cast acrylic from Cyro, Rockaway, NJ; this material did not contain a hard coating |
| TMPTA | trimethylol propane triacrylate, a multifunctional ethylenically unsaturated acrylate not capable of hydrogen bonding |
| HEA | hydroxy ethyl acrylate, a monofunctional acrylate |
| TEGDA | tetraethyl glycol diacrylate, a multifunctional ethylenically unsaturated acrylate not capable of hydrogen bonding |

Example 1

PETA:DMA

The following materials and weight ratios were mixed together to form the coating precursor composition: (1 A) 26.6 parts ALSOL; 9 parts PETA; 1 part DMA; 0.4 part PH1; 0.067 part LA; and 0.2 part UVST; (1B) 26.6 parts ALSOL; 8 parts PETA; 2 parts DMA; 0.4 part PH1; 0.067 part LA; and 0.2 part UVST; and (1 C) 26.6 parts ALSOL; 7 parts PETA; 3 parts DMA; 0.4 part PH1; 0.067 part LA; and 0.2 part UVST. The resulting coating precursor composition was filtered through a 1.0 micrometer polypropylene filter and then flow coated at 72° F. over TM1 to form a coating of 6 micrometers thick. Next, the transparency was placed into a forced-air oven at 57° C. (135° F.) for 2.5 minutes to remove the solvent. The transparency was then exposed to a single RPC ultraviolet lamp operating at 300 Watts/inch (120 Watts/cm) at 6.1 meters/minute (20 feet per minute) to cure the precursor composition. The resultant coated transparency was subjected to the test procedures described below to assess the properties of the protective coating.

Example 2

70:30 TMPTA:DMA

A coating on the thermoplastic material was made in the same manner as described in Example 1 and coated on TM2 in the same manner as described in Example 1. The precursor composition included 25.3 parts ALSOL, 7.0 parts TMPTA, 3.0 parts DMA, 0.4 part PH1, 0.067 part LA, and 0.2 part UVST.

Example 3

70:30 TEGDA:DMA

A coating on the thermoplastic material was made in the same manner as described in Example 1 and coated on TM2 in the same manner as described in Example 1. The precursor composition included 25.3 parts ALSOL, 7.0 parts TEGDA, 3.0 parts DMA, 0.4 part PH1, 0.067 part LA, and 0.2 part UVST.

Comparative Example A

60:40 PETA:DMA

A coating on the thermoplastic material was made in the same manner as described in Example 1 and coated on TM1 in the same manner as described in Example 1. The precursor composition included 26.6 parts ALSOL, 6 parts PETA, 4 parts DMA, 0.4 part PH1, 0.067 part LA, and 0.2 part UVST.

Comparative Example B

50:50 PETA:DMA

A coating on the thermoplastic material was made in the same manner as described in Example 1 and coated on TM1 in the same manner as described in Example 1. The precursor composition included 26.6 parts ALSOL; 5 parts PETA; 5 parts DMA; 0.4 part PH1; 0.067 part LA; and 0.2 part UVST.

Comparative Example C

No DMA

A coating on the thermoplastic material was made in the same manner as described in Example 1 and coated on TM2 in the same manner as described in Example 1. The precursor composition included 24.3 parts ALSOL, 10.0 parts PETA, 0.4 part PH1, 0.067 part LA, and 0.2 part UVST. There was no DMA in this composition.

Comparative Example D

A Monofuncational Acrylate

A coating on the thermoplastic material was made in the same manner as described in Example 1 and coated on TM2 in the same manner as described in Example 1. The precursor composition included 25.3 parts ALSOL, 7.0 parts HEA, 3.0 parts DMA, 0.4 part PH1, 0.067 part LA, and 0.2 part UVST. There was no multifunctional ethylenically unsaturated (meth)acrylate capable of hydrogen bonding in this composition.

Comparative Example E

Uncoated Thermoplastic

This comparative example was the uncoated TM1 material. Thus, this comparative example was the baseline material to which the protective coating of the invention was compared.

Comparative Example F

Commercial Product

Comparative Example F was a commercially available thermoplastic sheeting made from polycarbonate that contained a protective coating. This sheeting was available from General Electric, Co., Pittsfield, Mass., under the trade designation MR5.

Comparative Example G

Commercial Product

Comparative Example G was a commercially available thermoplastic sheeting made from a polyacrylic that contained a protective coating. This sheeting was available from E.I. DuPont Nemours, Co., Wilmington, Del., under the trade designation SARII.

Comparative Example H

Commercial Product

Comparative Example H was a commercially available thermoplastic sheeting made from polycarbonate that contained a protective coating. This sheeting was available from Cyro, Rockaway, N.J., under the trade designation AR.

Comparative Example I

Commercial Product

The protective coating on the thermoplastic material for Comparative Example 1 was PHOTO GUARD protective coating (primarily trimethyloxy[3-(oxiranyl(methoxy)propyl]silane), commercially available from 3M Co., St. Paul, Minn.

The following test procedures were used to evaluate the protective coatings of the present invention.

Test Procedure I: Dry Adhesion

This test was run according to ASTM Test Procedure D3359-93 (Standard Test Methods for Measuring Adhesion by Tape Test), the disclosure of which is incorporated herein by reference. This is a cross hatch adhesion test to determine how well the abrasion resistant coating adheres to the thermoplastic substrate. The test was carried out using a multiblade cutter commercially available from BYK-Gardner, Inc. of Silverspring, Md., as BYK-Gardner IMM, DIN/ISO. The cutter had six parallel blades spaced 1 mm (0.04 inch) apart. The test specimen was cut in a cross-hatch pattern according to FIG. 1 of ASTM D3359-93. After the cutes were made, the surface was brushed lightly to remove any surface debris. The adhesion of the coating was tested by applying a 2.5 cm wide piece of adhesive tape (SCOTCH Transparent Tape, commercially available from 3M Co., St. Paul, Minn.) to the surface, and then removing the tape at a rapid rate. The grid was examined using an illuminated magnifier and rated according to the classifications set forth in ASTM D3359-93. To provide an effective protective coating for a particular thermoplastic substrate, the precursor composition must cure to a coating having an adhesion value of G+0/5B on the Gardner Scale, which represents no delamination. That is, the edges of the cuts are completely smooth with none of the squares of the grid detached. The coating of Example 1C passed this test with an adhesion value of G+0/5B.

Test Procedure II: Adhesion Under Wet & Elevated Temperature Conditions

This test assesses the adhesion between the protective coating and the thermoplastic substrate after being submerged in water. A 2.5 cm by 25 cm sample of a coated substrate was submerged in a water bath that was continuously heated at 82° C. for 24 hours. At the end of the 24 hours, the sample was removed and examined for any delamination. The coating of Example 1C displayed no delamination alter 24 hours of testing.

Test Procedure III: Adhesion Under Low Temperature Conditions

This test assesses the adhesion between the protective coating and the thermoplastic substrate after being submerged in liquid nitrogen. A 2.5 cm by 25 cm sample of a coated substrate was submerged in a liquid nitrogen bath at about −196° C. for 24 hours. At the end of the 24 hours, the sample was removed and examined for any delamination, cracking, checking. The coating of Example 1C displayed no delamination or other deleterious effects after 24 hours of testing.

Test Procedure IV: Adhesion Under Acidic Conditions

This test procedure tested the adhesion of the protective coating to the thermoplastic substrate under acidic conditions. A 3 ml drop of 75 wt-% concentrated sulfuric acid about the size of a 2.5 cm circle was placed in the center of a 5 cm by 5 cm square sample over the surface of the protective coating. The samples were then placed in a desicator and after 24, 48, 72, and 96 hours removed, washed with water, and visually inspected. After each check, another 3 ml drop of wt-% concentrated sulfuric acid was applied to the surface. The test results can be found in Table 2. The term "failed" meant that the test sample failed within 96 hours. The failure was determined by the delamination or peeling of the protective coating from the thermoplastic substrate. The term "passed" meant that there was no delamination or degradation of the protective coating after 96 hours. For example, the coating of Example 1 C displayed no deleterious effects after 140 hours of testing. All other samples that "failed" did so within the first 24 hours.

TABLE 2

| Example | Test Result |
|---|---|
| 1A | Passed |
| 1B | Passed |
| 1C | Passed |
| 2 | Passed |
| 3 | Failed |
| Comparative A | Failed |
| Comparative B | Failed |
| Comparative C | Passed |
| Comparative D | Failed |
| Comparative E | Failed |
| Comparative F | Passed |
| Comparative G | Passed |
| Comparative H | Passed |
| Comparative I | Failed |

Test Procedure V: Abrasion Resistance

This test measures the Taber abrasion of the coating performed according to ASTM D1044-93 (Standard Method for Resistance of Transparent Plastics to Surface Abrasion)

and ASTM D1003-61 (reapproved 1988, Standard Test Method for Haze and Luminous Transmittance of Transparent Plastics), the disclosures of which are incorporated herein by reference. Briefly, this method involved measuring the initial haze value of a sample on the HAZE-GARD PLUS tester, available from BYK-Gardner Inc., Silverspring, MD (the tester complied with ASTM D1003-61), as a reference point. The sample was then abraded on a TABER HAZE tester for 500 cycles using a 500 gram load with a CS-10F wheel. The sample was then evaluated again on the HAZE-GARD PLUS tester. The test results are reported as the percent change in haze. Preferably, the percent haze change is less than about 20%, more preferably less than about 15%, and most preferably less than about 10%. The test results for this test can be found in Table 3.

TABLE 3

| Example | % Haze Change at 500 Cycles |
| --- | --- |
| 1A | 7.6% |
| 1B | 7.5% |
| 1C | 7.7% |
| 2 | 20.1% |
| 3 | 18% |
| Comparative A | 6.9% |
| Comparative B | 11.0% |
| Comparative C | 8.2% |
| Comparative D | 27.6% |
| Comparative E | 23% |
| Comparative F | 3.8% |
| Comparative G | 3.9% |
| Comparative H | 2.9% |
| Comparative I | 8.0% |

Test Procedure VI: Stress-to-Craze

This test assesses the ability of the protective coating on a thermoplastic substrate to withstand crazing as a result of elongation under acidic conditions. The test was conducted on Example 1 C and Comparative Example E according to ASTM Test Standard F484-83 (Standard Test Method for Stress Crazing of Acrylic Plastics in Contact with Liquid or Semi-Liquid Compounds), the disclosure of which is incorporated herein by reference. Briefly, a stress of at least psi was applied (for Example 1C a stress of 6400 psi was applied and for Comparative Example E a stress of 6000 psi was applied) at the fulcrum on a sample 2.5 cm wide. A 2 cm wide strip of fiberglass cloth was soaked in 75 wt-% concentrated sulfuric acid. This was applied lengthwise onto the top of the thermoplastic or coated thermoplastic specimen. The load was applied in accordance to the following formula: stress at the fulcrum=$S=6LP/wt^2$, wherein P=load (pounds), w=specimen width, L=distance from fulcrum to the applied load, t=specimen thickness. To provide an effective flexible abrasion-resistant protective coating for a particular thermoplastic substrate, the precursor composition should cure to a coating that can withstand at least 4 hours with a stress of 6000 psi at the fulcrum in the acidic conditions of this test with no deleterious effects (e.g., no crazing). The coating of Example 1C exhibited no crazing after 68 hours of testing at 6400 psi. Comparative Example E (no protective coating) exhibited crazing between 6000–5000 psi stress after 4 hours of testing.

Test Procedure VII: Flexibility

This test measures the relative "flexibility" of the protective coating and how well the coating adheres to the thermoplastic substrate. This test was similar to ASTM D522-92 (Standard Test Methods for Mandrel Bend Test of Attached Organic Coatings). A 5 cm by 20 cm sample was installed between two jaws of a vise mounted on a work table. The jaws were gradually moved toward one another to arc the sample while at the same time there was visual inspection of the coating. The jaws were moved toward each other until there was a failure as determined by visually inspecting the inside of the arc of the thermoplastic substrate. Failure occurred when one of the following conditions was met: (1) cracks in the coating; (2) delamination of the coating; or (3) degradation of the coating. The radius of the arc at which the failure occurred was measured. The results are listed in Table 4. The lower the number, the more flexible the coating. Preferably, the radius of the arc is less than about 4 inches (10 cm) for the appropriate flexibility for use on an aircraft transparency.

TABLE 4

| Example | Arc Radius Measurement (Inches (cm)) |
| --- | --- |
| 1A | Not Tested |
| 1B | Not Tested |
| 1C | 2.8 (7.0) |
| 2 | Not Tested |
| 3 | 1.5 (3.8) |
| Comparative A | Not Tested |
| Comparative B | Not Tested |
| Comparative C | 8.0 (20.3) |
| Comparative D | 1.5 (3.8) |
| Comparative E | Not Coated |
| Comparative F | 5.5 (14.0) |
| Comparative G | 8.0 (20.3) |
| Comparative H | 4.5 (11.4) |
| Comparative I | Not Tested |

Test Procedure VIII: Weatherability

This test assesses the ability of the protective coating on a thermoplastic substrate to withstand weathering conditions (e.g., sunlight). The test was conducted according to ASTM Test Standard G26-88, Type B, BH (Standard Practice for Operating Light-Exposure Apparatus (Xenon-Arc Type) With and Without Water for Exposure of Nonmetallic Materials), the disclosure of which is incorporated herein by reference. Briefly, a sample was exposed to a 6500 Watt xenon burner filter by borosilicate inner and outer filters at 0.35 W/m$^2$ in a Water-Cooled Xenon Arc Model 65XWWR Weathering Chamber, available from Atlas Electric Devices Co., Chicago, Ill. , for repetitive cycles of 102 minutes at 63° C. followed by 18 minutes with a water spray. To provide an effective flexible abrasion-resistant protective coating for a particular thermoplastic substrate, the precursor composition should cure to a coating that can withstand exposure under these conditions for 2000 hours without significant discoloration, checking, or cracking. The coating of Example 1C. passed this test.

Test Procedure IX: Tintability

This test assesses the ability of the protective coating on a thermoplastic substrate to resist tinting. The test involved exposing a sample to a 205° F. distilled water solution containing Molecular Catalytic black dye available from Brain Power Inc., Miami, Fla. at a concentration of 2.5 ounces per quart of water for 45 minutes. The percent transmittance was then measured. The coating of Example 1C absorbed very little dye.

The coating of Example 1C passed all of these tests; however, the coatings of Examples 2 and 3, which contained multifunctional ethylenically usaturated esters of (meth) acrylic acids that are not capable of hydrogen bonding, failed certain tests, but did extremely well in others. It is believed that these compositions could be modified readily by one of skill in the art to improve their performance in these other tests. The coating of Examples 1A and 1B also passed all the tests except they were not tested for flexibility, although they are expected to have good flexibility.

The complete disclosures of all patents, patent documents, and publications are incorporated herein by reference as if individually incorporated. Various modifications and alterations of this invention will become apparent to those skilled in the art without departing from the scope and spirit of this invention. It should be understood that this invention is not to be unduly limited to the illustrative embodiments set forth herein.

What is claimed is:

1. A method for preparing an acid-resistant and abrasion-resistant aircraft transparency, the method comprising:
   (a) providing an aircraft transparency;
   (b) applying a silica-free protective coating precursor composition to at least one surface of the aircraft transparency, wherein the silica-free protective coating precursor composition comprises:
      (i) a multifunctional ethylenically unsaturated ester of acrylic acid, a multifunctional ethylenically unsaturated ester of methacrylic acid, or a combination thereof; and
      (ii) an acrylamide of the formula:

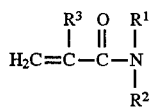

wherein:
   (A) $R^1$ and $R^2$ are each independently hydrogen, a $(C_1-C_8)$ alkyl group optionally having hydroxy, halide, carbonyl, and amido functionalities, a $(C_1-C_8)$alkylene group optionally having carbonyl and amido functionalities, a $(C_1-C_4)$ alkoxymethyl group, a $(C_4-C_{18})$ aryl group, a $(C_1-C_3)$alk$(C_4-C_8)$aryl group, and a $(C_4-C_{18})$ heteroaryl group; with the proviso that only one of $R^1$ and $R^2$ is hydrogen; and
   (B) $R^3$ is hydrogen, a halogen, or a methyl group; and
   (c) exposing the protective coating precursor composition to conditions to cure the composition and form a protective coating on at least one surface of the thermoplastic transparency.

2. The method according to claim 1 wherein the step of curing comprises exposing the silica-free protective coating precursor composition to radiation.

3. The method according to claim 1 wherein the silica-free protective coating precursor composition further includes a leveling agent.

4. The method according to claim 1 wherein the silica-free protective coating precursor composition is applied directly to at least one surface of the thermoplastic transparency.

5. The method according to claim 1 wherein the multifunctional ethylenically unsaturated ester of acrylic acid is selected from the group consisting of a trifunctional ethylenically unsaturated ester of acrylic or methacrylic acid, a tetrafunctional ethylenically unsaturated ester of acrylic or methacrylic acid, and a combination thereof.

6. The method according to claim 1 wherein the multifunctional ethylenically unsaturated ester of (meth)acrylic acid comprises pentaerythritol triacrylate and the acrylamide comprises N,N-dimethylacrylamide.

7. The method according to claim 6 wherein the silica-free protective coating precursor composition comprises:
   (a) about 65–95 parts of the multifunctional ethylenically unsaturated ester of acrylic acid, methacrylic acid, or combination thereof, and
   (b) about 5–35 parts of the acrylamide.

8. The method according to claim 7 wherein the silica-free protective coating precursor composition comprises:
   (a) about 70–90 parts of the multifunctional ethylenically unsaturated ester of acrylic acid, methacrylic acid, or combination thereof, and
   (b) about 10–30 parts of the acrylamide.

9. The method according to claim 1 wherein the silica-free protective coating precursor composition comprises:
   (a) about 65–95 parts of the multifunctional ethylenically unsaturated ester of acrylic acid, methacrylic acid, or combination thereof, and
   (b) about 5–35 parts of the acrylamide.

* * * * *

UNITED STATES PATENT AND TRADEMARK OFFICE
CERTIFICATE OF CORRECTION

PATENT NO.: 5,633,049
DATED: May 27, 1997
INVENTOR(S): Zayn Bilkadi and Thomas W. Rambosek It is certified that error appears in the above-identified patent and that said Letters Patent is hereby corrected as shown below:

On the title page, Item
[56] References Cited
U.S. PATENT DOCUMENTS    "4,722,377" should read --4,622,377--

| | |
|---|---|
| Col. 1, line 48 | "(Belinares)" should read --(Belmares)-- |
| Col. 5, line 30 | "acrylonitrile butadiene-styrene" should read --acrylonitrile-butadiene-styrene-- |
| Col. 6, line 53 | "2,2-dimethyl-3,3-propanediol" should read --2,2-dimethyl-1,3-propanediol-- |
| Col. 6, line 57 | "trioIs" should read --triols-- |
| Col. 7, line 32 | "($C_4$—$C_8$)aryl" should read --($C_4$—$C_{18}$)aryl-- |
| Col. 9, line 62 | delete "o-chlorobenzaldehyde, chlorobenzaldehyde" and replace with --o-chlorobenzaldehyde-- |
| Col. 14, line 30 | "PET&" should read --PETA-- |
| Col. 15, line 59 | "cutes" should read --cuts-- |
| Col. 16, line 37 | "wt-%" should read --75 wt-%-- |
| Col. 17, line 41 | "psi" should read --6000 psi-- |

Signed and Sealed this

Fourteenth Day of July, 1998

Attest:

Attesting Officer

BRUCE LEHMAN
Commissioner of Patents and Trademarks